US011418853B2

(12) United States Patent
Li et al.

(10) Patent No.: US 11,418,853 B2
(45) Date of Patent: *Aug. 16, 2022

(54) TRICK PLAYBACK OF VIDEO DATA

(71) Applicant: INTERDIGITAL MADISON PATENT HOLDINGS, SAS, Paris (FR)

(72) Inventors: Jun Li, Cranbury, NJ (US); Jun Xu, Beijing (CN); Xiaojun Ma, Beijing (CN); Jianfeng Chen, Beijing (CN)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 734 days.

This patent is subject to a terminal disclaimer.

(21) Appl. No.: 15/704,050

(22) Filed: Sep. 14, 2017

(65) Prior Publication Data
US 2018/0007445 A1 Jan. 4, 2018

Related U.S. Application Data

(63) Continuation of application No. 13/634,864, filed as application No. PCT/CN2010/000413 on Mar. 31, 2010, now Pat. No. 9,866,922.

(51) Int. Cl.
*H04N 21/6587* (2011.01)
*H04N 21/432* (2011.01)
(Continued)

(52) U.S. Cl.
CPC ....... *H04N 21/6587* (2013.01); *G11B 27/005* (2013.01); *G11B 27/34* (2013.01);
(Continued)

(58) Field of Classification Search
CPC ........... H04N 21/4126; H04N 21/4325; H04N 21/6587; H04N 21/42208; H04N 21/4222;
(Continued)

(56) References Cited

U.S. PATENT DOCUMENTS

| 5,655,117 A | 8/1997 | Goldberg et al. |
| 7,190,345 B2 | 3/2007 | Nashida et al. |

(Continued)

FOREIGN PATENT DOCUMENTS

| CN | 1732685 | 2/2006 |
| CN | 1905661 | 1/2007 |

(Continued)

OTHER PUBLICATIONS

Foina, Aislan G., et al., "How A Cell Phone Can Change Dramatically The Way We Watch TV," May 18, 2009, EUROCON 2009, IEEE Piscataway, pp. 1265-1271.

(Continued)

*Primary Examiner* — Loi H Tran
(74) *Attorney, Agent, or Firm* — Jerome G. Schaefer

(57) ABSTRACT

A portable device controlling playback of video data on a first device external to the portable device and including a browser module operative to present a display of a plurality of images, each image corresponding to a section of the video data, and to highlight an image corresponding to the section of the video data currently played back by the first device, a communication module coupled to the browser module and operative, in response to a selection of an image among the plurality of images by a user, to transmit a first command to the first device to play back the video data corresponding to the image selected by the user, wherein the browser module is further operative to adapt highlighting of the plurality of images in response to a second command received from said first device upon a change of the section of video data currently played back on the first device.

6 Claims, 11 Drawing Sheets

(51) Int. Cl.
| | |
|---|---|
| *G11B 27/34* | (2006.01) |
| *H04N 21/422* | (2011.01) |
| *H04N 21/482* | (2011.01) |
| *G11B 27/00* | (2006.01) |
| *H04N 21/41* | (2011.01) |
| *H04N 21/43* | (2011.01) |

(52) U.S. Cl.
CPC ... *H04N 21/41265* (2020.08); *H04N 21/4222* (2013.01); *H04N 21/42208* (2013.01); *H04N 21/4325* (2013.01); *H04N 21/43079* (2020.08); *H04N 21/4825* (2013.01)

(58) Field of Classification Search
CPC .......... H04N 21/4307; H04N 21/4825; H04N 21/42207; H04N 21/41265; H04N 21/43079; H04N 5/00; G11B 27/34; G11B 27/005; G06F 12/00
USPC ....................................................... 386/248
See application file for complete search history.

(56) References Cited

U.S. PATENT DOCUMENTS

| | | | |
|---|---|---|---|
| 9,253,222 | B2 | 2/2016 | Shamma |
| 2002/0039481 | A1 | 4/2002 | Jun et al. |
| 2002/0099774 | A1 | 7/2002 | Yamato et al. |
| 2003/0035075 | A1 | 2/2003 | Butler et al. |
| 2003/0165321 | A1 | 9/2003 | Blair et al. |
| 2004/0240841 | A1 | 12/2004 | Takagi et al. |
| 2006/0041908 | A1 | 2/2006 | Kim et al. |
| 2007/0025687 | A1 | 2/2007 | Kim |
| 2007/0204238 | A1* | 8/2007 | Hua ................. G06F 16/743 715/838 |
| 2007/0206024 | A1 | 9/2007 | Rao |
| 2008/0069516 | A1 | 3/2008 | Takahashi et al. |
| 2008/0107401 | A1 | 5/2008 | Vannier |
| 2008/0126543 | A1* | 5/2008 | Hamada ............. G06F 16/41 709/225 |
| 2008/0155627 | A1 | 6/2008 | O'Connor et al. |
| 2008/0168514 | A1 | 7/2008 | Jeon |
| 2008/0209075 | A1 | 8/2008 | Shamma |
| 2008/0263605 | A1 | 10/2008 | Mine et al. |
| 2009/0089844 | A1 | 4/2009 | Zafar |
| 2009/0110363 | A1* | 4/2009 | Kim ................. G11B 27/105 386/241 |
| 2009/0153289 | A1 | 6/2009 | Hope et al. |
| 2009/0172780 | A1 | 7/2009 | Sukeda et al. |
| 2009/0196575 | A1 | 8/2009 | Masuo |
| 2009/0198607 | A1* | 8/2009 | Badger ............... G06Q 30/02 705/37 |
| 2009/0300499 | A1 | 12/2009 | Fukui |
| 2009/0317064 | A1 | 12/2009 | Matsubayashi |
| 2009/0327894 | A1 | 12/2009 | Rakib et al. |
| 2010/0195975 | A1 | 8/2010 | Issa et al. |
| 2011/0064386 | A1* | 3/2011 | Gharaat ............ G06Q 30/0244 386/250 |
| 2011/0196918 | A1 | 8/2011 | Kkunigita et al. |
| 2011/0218997 | A1 | 9/2011 | Boiman et al. |
| 2011/0230178 | A1* | 9/2011 | Jones ................. H04M 1/0235 455/422.1 |
| 2013/0188933 | A1 | 7/2013 | Li et al. |

FOREIGN PATENT DOCUMENTS

| | | |
|---|---|---|
| CN | 101599241 | 12/2009 |
| EP | 0827092 | 3/1998 |
| EP | 1125287 | 8/2001 |
| EP | 1603111 | 12/2005 |
| EP | 1833050 | 9/2007 |
| EP | 1845724 | 10/2007 |
| EP | 2107568 | 10/2009 |
| JP | 10243351 | 9/1998 |
| JP | 11112870 | 4/1999 |
| JP | 2001350775 | 12/2001 |
| JP | 2002218277 | 8/2002 |
| JP | 2002330419 | 11/2002 |
| JP | 2003032509 | 1/2003 |
| JP | 2005286798 | 10/2005 |
| JP | 2007174245 | 7/2007 |
| JP | 2007306088 | 11/2007 |
| JP | 2007318200 | 12/2007 |
| JP | 2008259119 | 10/2008 |
| JP | 2009124298 | 6/2009 |
| JP | 2009130876 | 6/2009 |
| JP | 2009159188 | 7/2009 |
| JP | 2009182803 | 8/2009 |
| KR | 1020090125111 | 12/2009 |
| WO | WO9930488 | 6/1999 |
| WO | WO03051043 | 6/2003 |
| WO | WO03098524 | 11/2003 |
| WO | WO2004059971 | 7/2004 |
| WO | WO2004079709 | 9/2004 |
| WO | WO2005036875 | 4/2005 |
| WO | WO2006004749 | 4/2006 |
| WO | WO2006092765 | 9/2006 |
| WO | WO2007110813 | 10/2007 |
| WO | WO2007148777 | 12/2007 |
| WO | WO2009097492 | 8/2009 |
| WO | WO2010023828 | 3/2010 |
| WO | WO2011120195 | 10/2011 |
| WO | WO2012036658 | 3/2012 |

OTHER PUBLICATIONS

EP Search Report for Corresponding EP Application No. 10848657.2 dated Oct. 24, 2013.
U.S. Non-Final Office Action for related U.S. Appl. No. 13/824,344 dated Nov. 21, 2013.
Notice of Allowance for Corresponding U.S. Appl. No. 13/824,344 dated Aug. 15, 2014.
Cooper et al., "Scene Boundary Detection Via Video Self-Similarity Analysis", FX Palo Alto Laboratory, Palo Alto, CA Apr. 26, 2011.
Truong et al., "Automatic Scene Extraction in Motion Pictures", IBM Research Report, Yorktown Heights, NY, Sep. 24, 2002.

* cited by examiner

TRICK PLAYBACK OF VIDEO DATA

FIELD OF THE INVENTION

The present invention relates generally to video system, and more particularly, to method and apparatus of trick playback of video data.

BACKGROUND OF THE INVENTION

Digital video recording (DVR) technology has made it possible to provide more intelligent trick playback of video data, in addition to the traditional time based trick mode. For example, advertisement zapping is proposed, allowing a user to skip a specific period if the video is pre-recorded and indexed with adequate meta-data.

There are various ways to insert resp. associate meta-data into resp. with a video stream. The automatic scene detection is a relevant technology, which can mark key scene changes of a video stream. Meta-data can be created for key scenes and inserted into a video stream.

The scene meta-data can be applied to support a scene-based trick mode. The scene-based trick mode concerns all playback control actions, such as fast forward, rewind or slow playback, the control being based on scenes instead of timestamps. The advantage of scene-based trick mode is to allow moving quickly through a video without losing important scenes.

A DVD chapter book menu can perform a scene-based playback control. However, it only supports a "GOTO"-style function which allows the playback to go to certain chapters/sessions of a movie. But this is not a replacement for the traditional trick mode.

A disadvantage of the above mentioned conventional scene-based trick mode is that it may confuse people who are used to the time-based trick mode through using traditional tools, such as a remote controller.

Another disadvantage arises from the lack of a mechanism for improving the trick mode creation.

SUMMARY OF THE INVENTION

According to one aspect of the invention, a method of controlling playback of video data on a first device by a second device is provided. The method comprises, at the level of the second device, the steps of: presenting an image corresponding to a section of the video data; and in response to a change of the presentation status of the image, transmitting a command to the first device to adapt the playback status of the section of video data on the first device as a function of the change of the presentation status of the image.

According to another aspect of the invention, an apparatus for controlling playback of video data on another device is provided. The apparatus comprises: means for displaying a set of images, each of which corresponds to a section of video data, in sequence of playback of video data sections; means for highlighting the image during the time interval of the playback of the corresponding section on the another device, and in response to a change of the displaying status of the image, for transmitting a command to the another device to adapt the playback status of the section of video data as a function of the change of the displaying status of the image.

BRIEF DESCRIPTION OF DRAWINGS

These and other aspects, features and advantages of the present invention will become apparent from the following description in connection with the accompanying drawings in which.

DETAIL DESCRIPTION OF PREFERRED EMBODIMENTS

In the following description, various aspects of an embodiment of the present invention will be described. For purposes of explanation, specific configurations and details are set forth in order to provide a thorough understanding. However, it will also be apparent to one skilled in the art that the present invention may be practiced without the specific details present herein.

In view of the foregoing disadvantages of the prior art, an embodiment of the present invention provides a video system that uses the interaction with a visual media on a second device to realize the trick mode for the video playback on a first device.

Specifically, a visual media, which corresponds to a video clip or a video section of the video playback on the first device, is presented on the second device. The presentation status of the visual media on the second device is synchronized with the playback status of the video on the first device. On one hand, the playback of a video section on the first device will lead to a presentation of the corresponding visual media on the second device. On the other hand, a status change of the visual media on the second device will also result in a corresponding change of the playback status of the video section on the first device. In this sense, there is a bi-directional synchronization between the presentation status of the visual media on the second device and the playback status of the video on the first device.

According to an embodiment of the invention, a video storybook is used as the visual media on the second device for the purpose of implementing a scene-based trick mode. A storybook is a book-like media display containing a collection of pages (slides, images), each of which represents the corresponding video section in the video program displayed on the first device. In a sense, the video storybook is a video summary of a video displayed on the first device for user to browse. The storybook is particularly beneficial to a mobile application since there is no need to transmit a full version of video for the trick play, which will save much bandwidth.

Next, an embodiment of a video system for implementing a scene-based trick playback on a first device by a storybook displayed on a second device according to the principle of the invention will be described in details.

Figure 1:
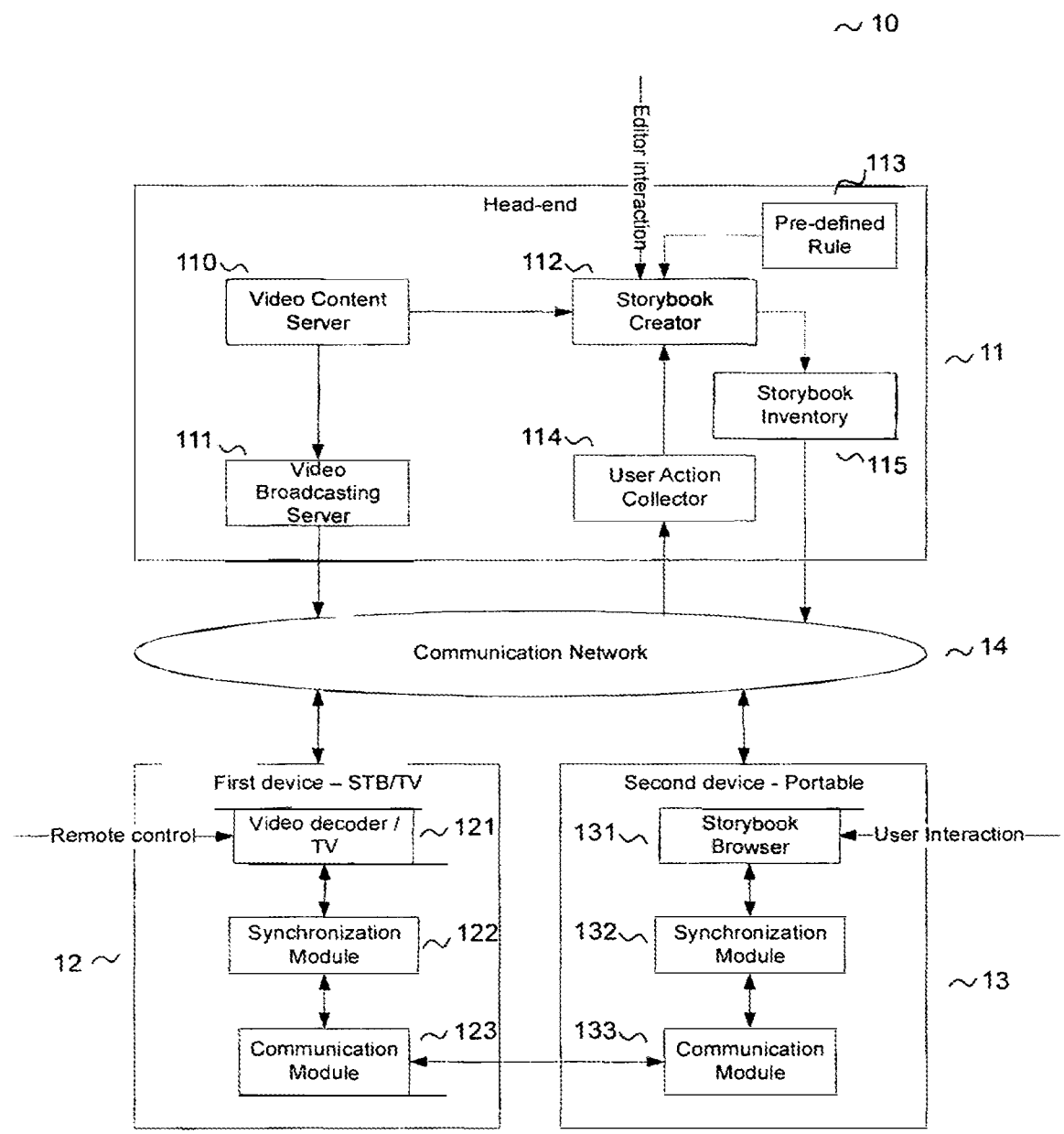
FIG. 1 is a block diagram of the video system according to an embodiment of the present invention.

FIG. 1 is a block diagram of the video system according to an embodiment of the present invention.

Referring to FIG. 1, the video system 10 comprises a head-end 11, a first device 12 for video data playback, and a second device 13 for presenting a storybook of the video data of the first device. The head-end 11, the first device 12 and the second device 13 are in signal communication via a communication network (CN) 14.

The first device 12 may include but is not limited to a Set Top Box (STB) or a TV set. The second Device 13 may include but is not limited to a portable device, a tablet, a PC or a laptop. The CN 14 may be any type that has the capability of carrying and transporting video content, such as broadcast network, IP network, or a combination thereof.

The head-end 11 comprises: a Video Content Server (VCS) 110 for providing video content; a Video Broadcasting Server (VBS) 111 for receiving the video content from VCS 110 and broadcasting to the CN 14 such as a cable network; a Storybook Creator (SC) 112 for creating storybooks for the video content from the VCS 110 based on a pre-defined rule (PR) 113. As shown in FIG. 1, the head-end 11 can also comprise a User Action Collector (UAC) 114 for collecting from the CN 14 and analyzing the action statistics that users performed on the storybook, and for sending the analysis results to SC 112 which can create storybooks based on the analysis results from UAC 114 and/or the above described pre-defined rule. As shown in FIG. 1, it can be appreciated that the SC 112 may also offer an editor interaction UI, through which an editor can create a storybook manually. The created storybooks can also be stored in a Storybook Inventory (SI) 115 before they are sent to the CN 14.

It should be noted in a case that the CN 14 in the system does not provide a return channel (e.g., in the case of a broadcast network), no user action statistics will be collected by the UAC 114.

The first device 12 comprises: a Video Decoder/TV (VD/TV) 121 for decoding the video from the CN 14 and performing video playback thereon; a Synchronization Module (SM) 122 for synchronizing the status of the video playback on the first device 12 to the display status of storybook on the second device 13; and a Communication Module (CM) 123 for communicating with the second device 13.

It can be appreciated that the status of video playback on the VD/TV 121 can be controlled by a remote controller (not shown) or commands from SM122 of the first device 12.

The SM122 will report the status of video playback on the VD/TV 121 of the first device 12 via the CM 123 to the second device 13 as a reference of synchronization of the status of the storybook display thereon. Specifically, the report can be time driven or event driven. That is, on one hand, the SM22 will send reports periodically to the second device 13 (we can call it a heartbeat mechanism), informing of the progress of the video playback on the VD/TV 121 of the first device 12 for the second device 13 to synchronize on. The period of the report transmission can be predefined based on the requirements of the application. On the other hand, the SM122 will detect if there are any changes in the status of the video playback on the VD/TV 121, for example, according to commands from the remote controller (as an example, if the user performs a fast forward action on remote controller which results in the progress change of video playback on VD/TV 121, the VD/TV 121 will immediately notify SM122 about it by sending a message to SM122). If yes, the SM122 will immediately transmit a report of the current video playback status of the first device 12 to the second device 13 through the CM 123 for the second device 13 to correspondingly change (synchronize) the status of the storybook display thereon.

As to be described later, the SM122 will also receive a report via the CM 123 from the second device 13 on the current status of storybook display and send a command to the VD/TV 121, requesting the progress or status of the video playback on the VD/TV 121 to be synchronized with that of the storybook display on the second device 13.

The second device 13 comprises: a Storybook Browser (SB) 131 for displaying a storybook; a Synchronization Module (SM) 132 for synchronizing the status of the storybook display on the second device 13 with the status of the video playback on the first device 12; and a Communication Module (CM) 133 for communicating with the first device 12.

The storybook can be created and transmitted to the second device 13 online or offline depending on the requirements of the video service. The head-end 11 can directly transmit the storybook to the second device 13 independently from the video content data. Alternatively, the storybook can be embedded within the video stream under the form of metadata or some marks at the head-end 11 (for example, in term of an MPEG-2 video system, the adaptation field in the MPEG-2 transport stream can be used to carry the link of storybook thanks to the available reserved bytes in the adaptation field) and transmitted to the first device 12 which will then extract the storybook relevant data and transmit it to the second device 13 to compose the storybook proper, using the metadata and video stream data (if appropriate e.g. to extract representative images). The storybook can be transmitted either in a self-contained fashion (the entire storybook data is transmitted) or by reference through links to data to be collected. In the latter case, the second device 13 can fetch the storybook data by accessing an appropriate server using the links.

As indicated earlier, the storybook may also be stored in the SI 115 of the head-end 11. In this case, a user can access the storybook by accessing the SI 115, e.g. through using an appropriate IP address. This IP address may be fixed and not necessarily sent with the video stream. When the user browses the storybooks and selects one of them, the corresponding video will be streamed from the head-end 11 to the first device 12.

The storybook can also be offered to users coupled with video on demand (VoD) or time-shift TV services.

Users may store video on the first device 12 coupled with the corresponding storybook by taking advantage of a personal video recorder (PVR) function.

According to a variant embodiment, if the CN 14 in FIG. 1 has a return channel, the user interaction with the storybook can be sent to the UAC 114 of the head-end 11 to facilitate and enrich the storybook creation. For example, the everyday click-through rates of the news video sections can be used for news selection in order to compose the weekly news storybook.

As mentioned above, upon receipt of a report from the first device 12 on the progress or status of the video playback, the SM132 will synchronize the progress or status of the storybook display on the SB 131 to that of the video playback on the first device 12.

The SM132 will report the status of the storybook display on the SB 131 of the second device 13 via the CM 133 to the first device 12 as a reference of synchronization of the status of the video playback thereon. In particular, the SM132 will detect the status of the storybook display on the SB 131 of the second device 13. If any changes in the status are detected, the SM132 will immediately report the current status of the storybook display of the second device 13 to the first device 12 through the CM 133.

The status of the storybook display on the SB 131 of the second device 13 can be changed or controlled according to the user interaction to the second device 13.

SM132 can also periodically send a report on the status of the storybook display on the second device 13 to the first device 12 in order to facilitate synchronization between the two devices.

Next, an embodiment of the operation procedure of the video system in FIG. 1 will be described in detail with reference to the FIGS. 2-8.

Figure 2:
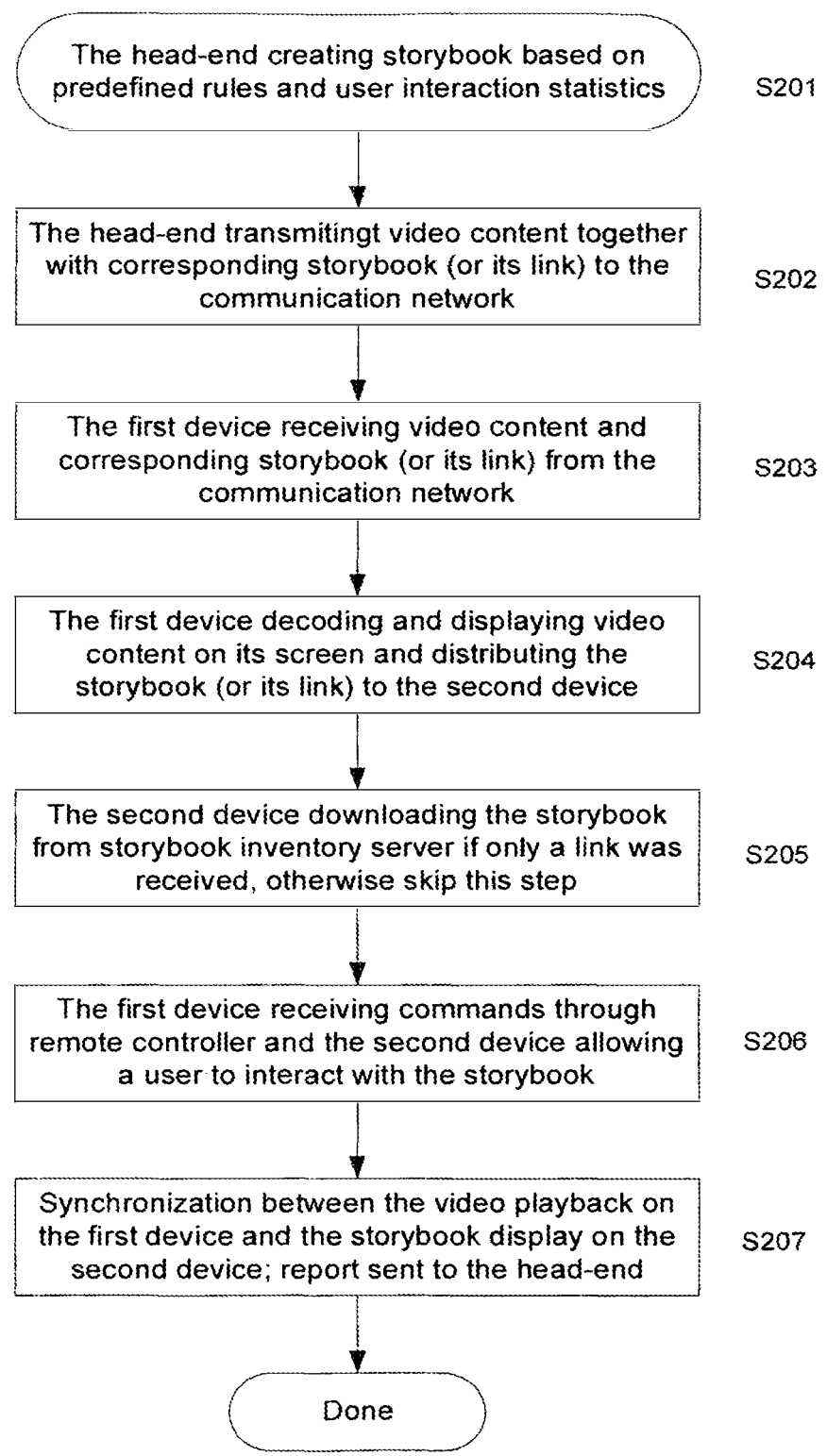
FIG. 2 is a high level flow chart showing the operation of the video system in FIG. 1.

FIG. 2 is a high level flow chart showing the operation of the video system in FIG. 1.

As shown in FIG. 2, at the step S201, the head-end 11 will create a storybook, for example, based on a predefined rule and user interaction statistics.

At the step S202, the head-end 11 sends video content together with corresponding the storybook (or its link) to the CN 14.

At the step S203, the first device 12 will receive video content and the corresponding storybook (or its link) from the CN 14.

At the step S204, the first device 12 will decode and display video content on its screen and distribute the storybook (or its link) to the second device 13.

At the step S205, in case the second device 13 receives a link for the storybook, it will download the storybook from the head-end 11.

At the step S206, the first device 12 will receive commands for example through a remote controller, and the second device 13 will allow the user to interact with the storybook thereon.

At the step S207, status synchronization will be performed between the video playback on the first device 12 and the storybook display on the second device 13. In this step, a report on user interactions can also be sent to the head-end 11 for improving the storybook creation in the future.

Figure 3:
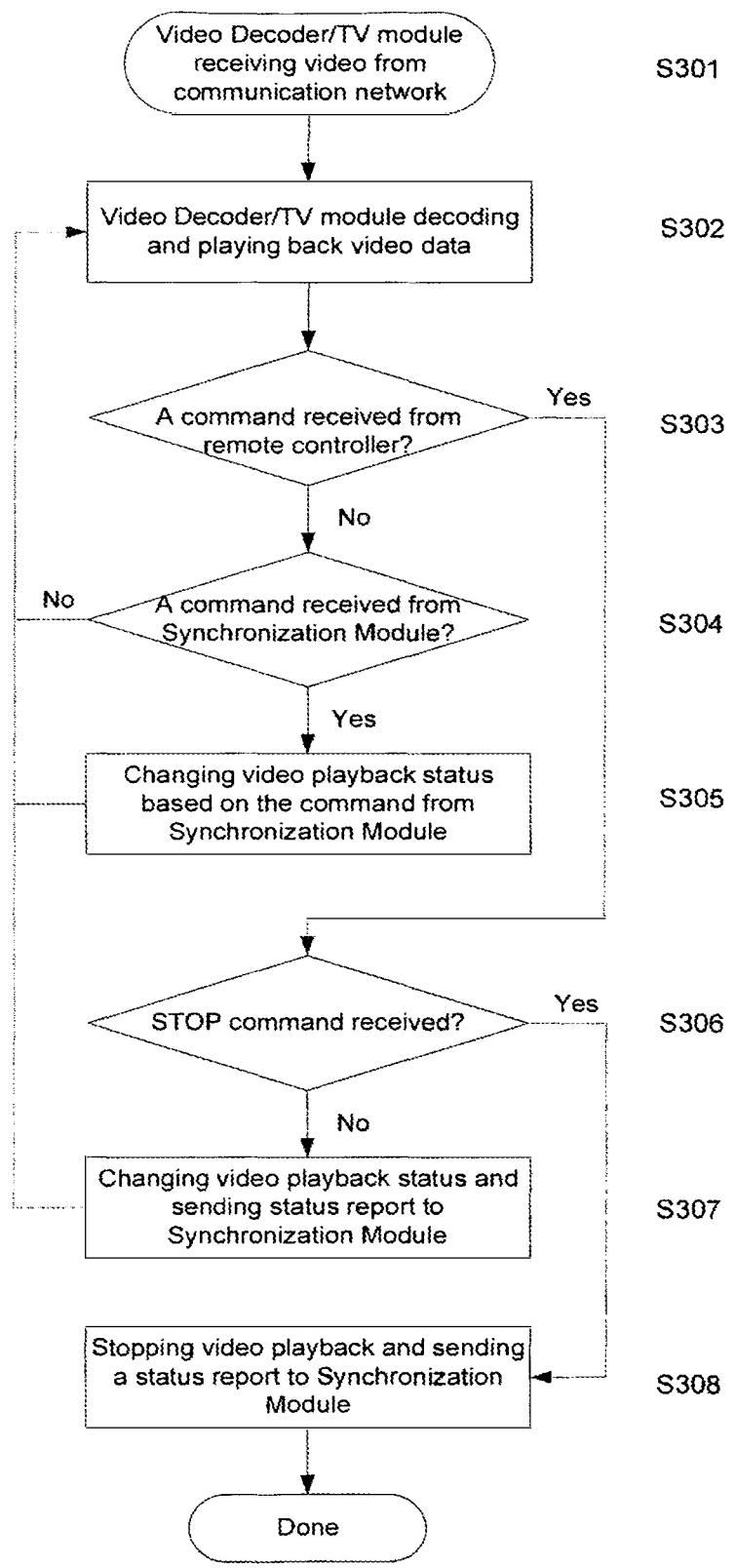
FIG. 3 is a flow chart showing the operation of Video Decoder/TV module of the first device.

FIG. 3 is a flow chart showing the operation of Video Decoder/TV module 121 of the first device 12.

As shown in FIG. 3, at the step S301, the Video Decoder/TV module 121 receives video data from the CN 14.

At the step S302, the Video Decoder/TV module 121 decodes and plays back the video data on the first device 12.

At the step S303, the Video Decoder/TV module 121 will determine whether a command is received, for example, from a remote controller.

If the result of the step S303 is "No", then the procedure will proceed to the step S304 where the Video Decoder/TV module 121 will further determine whether a command is received from the SM122. If the result of the step S304 is "Yes", the procedure will proceed to the step S305 where the Video Decoder/TV module 121 will correspondingly change video playback status based on the command from the SM122. Otherwise, the procedure will return to the step S302.

If the result of the step S303 is "Yes", then the procedure will proceed to the step S306 where the Video Decoder/TV module 121 will detect whether a STOP command is received.

If the result of the step S306 is "No", then the procedure will proceed to the step S307 where the Video Decoder/TV module 121 will change the video playback status and send a status report to the SM122. If the result of the step S306 is "Yes", then the procedure will proceed to the step S308 where the Video Decoder/TV module 121 will stop video playback and send a status report to the SM122.

Figure 4:
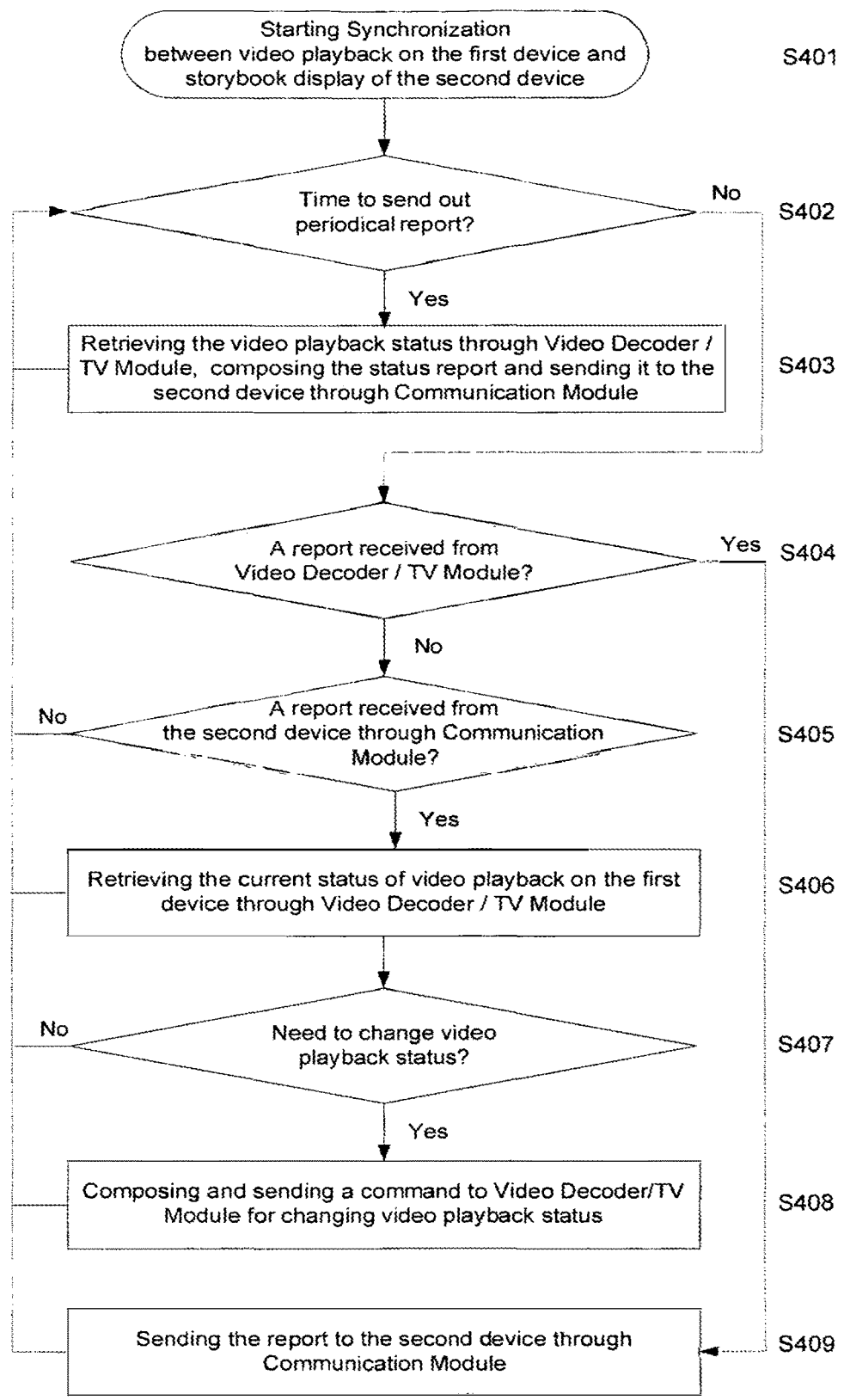
FIG. 4 is a flow chart showing the operation of the synchronization module of the first device.

FIG. 4 is a flow chart showing the operation of the SM122 of the first device 12.

As shown in FIG. 4, at the step S401, the SM122 starts to synchronize the video playback on the first device 12 with the storybook display on the second device 13.

At the step S402, the SM122 determines whether it is time to send out a periodical report.

If the result of the step S402 is "Yes", at the following step S403, the SM122 will retrieve the video playback status from the Video Decoder/TV module 121, compose the status report and send the report to the second device 13 through the CM 123.

If the result of the step S402 is "No", the procedure will proceed to the step S404 where the SM122 will determine whether a report is received from the Video Decoder/TV module 121.

If the result of the step S404 is "Yes", the procedure will proceed to the step S409 where the SM122 will send the report to the second device 13 through the CM 123.

If the result of the step S404 is "No", at the following step S405, the SM122 will determine whether a report is received from the second device 13 through the CM 123.

If the result of the step S405 is "No", the procedure will return to the step S402. If the result of the step S405 is "Yes", at the following step S406, the SM122 will retrieve the current status of video playback on the first device 11 from the Video Decoder/TV module 121.

At the following step S407, the SM122 will determine whether it needs to change video playback status. If the result of the step S407 is "No", the procedure will return to the step S402. If the result of the step S407 is "Yes", at the step S408, the SM122 will compose and send a command to the Video Decoder/TV module 121 for changing video playback status.

Figure 5:
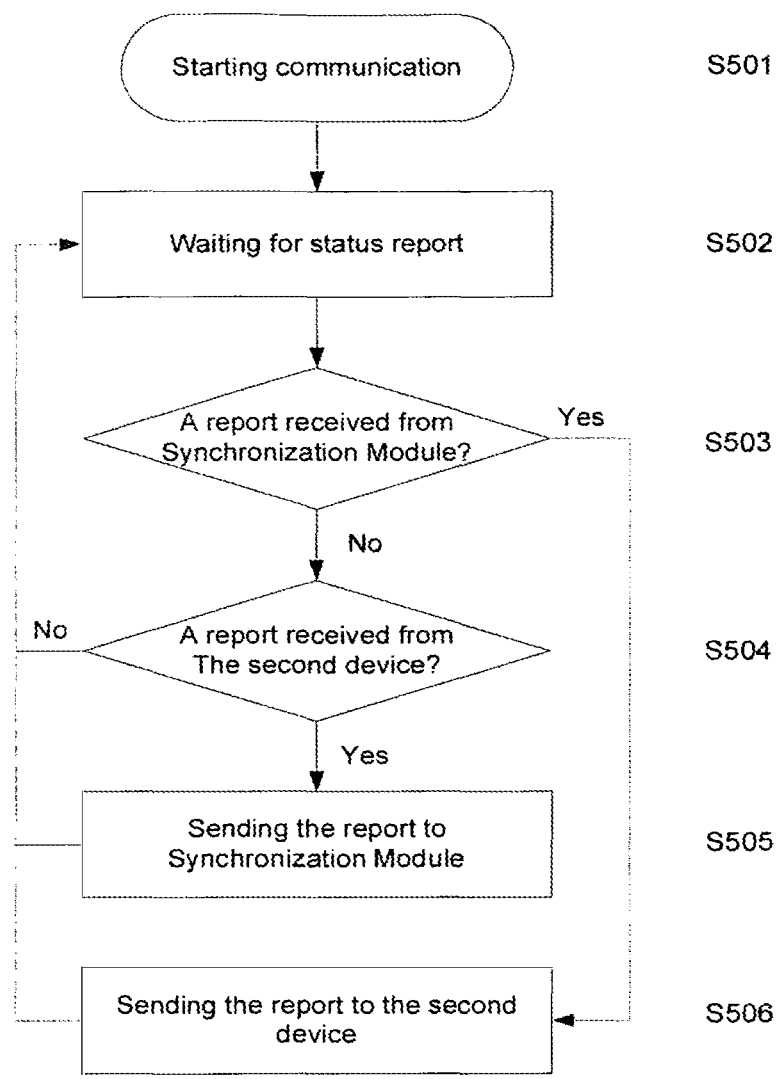
FIG. 5 is a flow chart showing the operation of communication module of the first device.

FIG. 5 is a flow chart showing the operation of CM 123 of the first device 12.

As shown in FIG. 5, at the step S501, the CM 123 starts communication.

At the step S502, the CM 123 will wait for a status report from the SM122 or the second device 13.

At the step S503, the CM 123 will determine whether a report is received from the SM122. If the result of the step S503 is "Yes", the procedure will proceed to the step S506 where the CM 123 will send the report to the second device 13. If the result of the step S503 is "No", the procedure will proceed to the step S504 where the CM 123 will determine whether a report is received from the second device 13.

If the result of the step S504 is "Yes", the procedure will proceed to the step S505 where the CM 123 will send the report to the SM122. If the result of the step S504 is "No", the procedure will return to the step S502.

Figure 6:
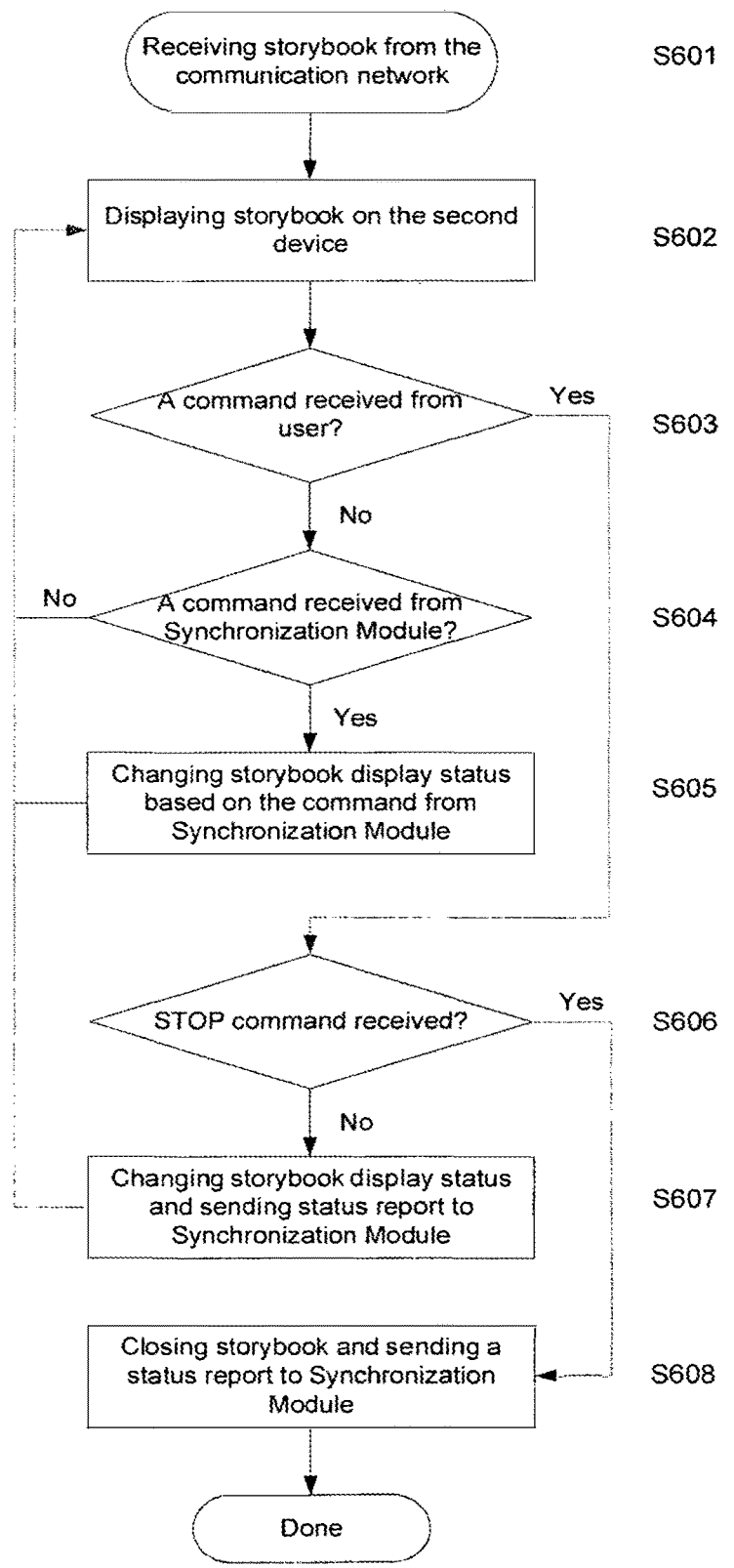
FIG. 6 is a flow chart showing the operation of the storybook browser of the second device.

FIG. 6 is a flow chart showing the operation of the SB 131 of the second device 13.

As shown in FIG. 6, at the step S601, the SB 131 receives the storybook from the CN 14.

At the step S602, the SB 131 displays the storybook on the second device 13.

At the step S603, the SB 131 will determine whether a command is received from the user.

If the result of the step S603 is "No", then the procedure will proceed to the step S604 where the SB 131 will further determine whether a command is received from the SM132. If the result of the step S604 is "Yes", the procedure will proceed to the step S605 where the SB 131 will correspondingly change the storybook playback status based on the command from the SM132. Otherwise, the procedure will return to the step S602.

If the result of the step S603 is "Yes", then the procedure will proceed to the step S606 where the SB 131 will detect whether a STOP command is received.

If the result of the step S606 is "No", then the procedure will proceed to the step S607 where the SB 131 will change storybook playback status and send status report to the SM132. If the result of the step S606 is "Yes", then the procedure will proceed to the step S608 where SB 131 will close the storybook and send a status report to the SM132.

Figure 7:
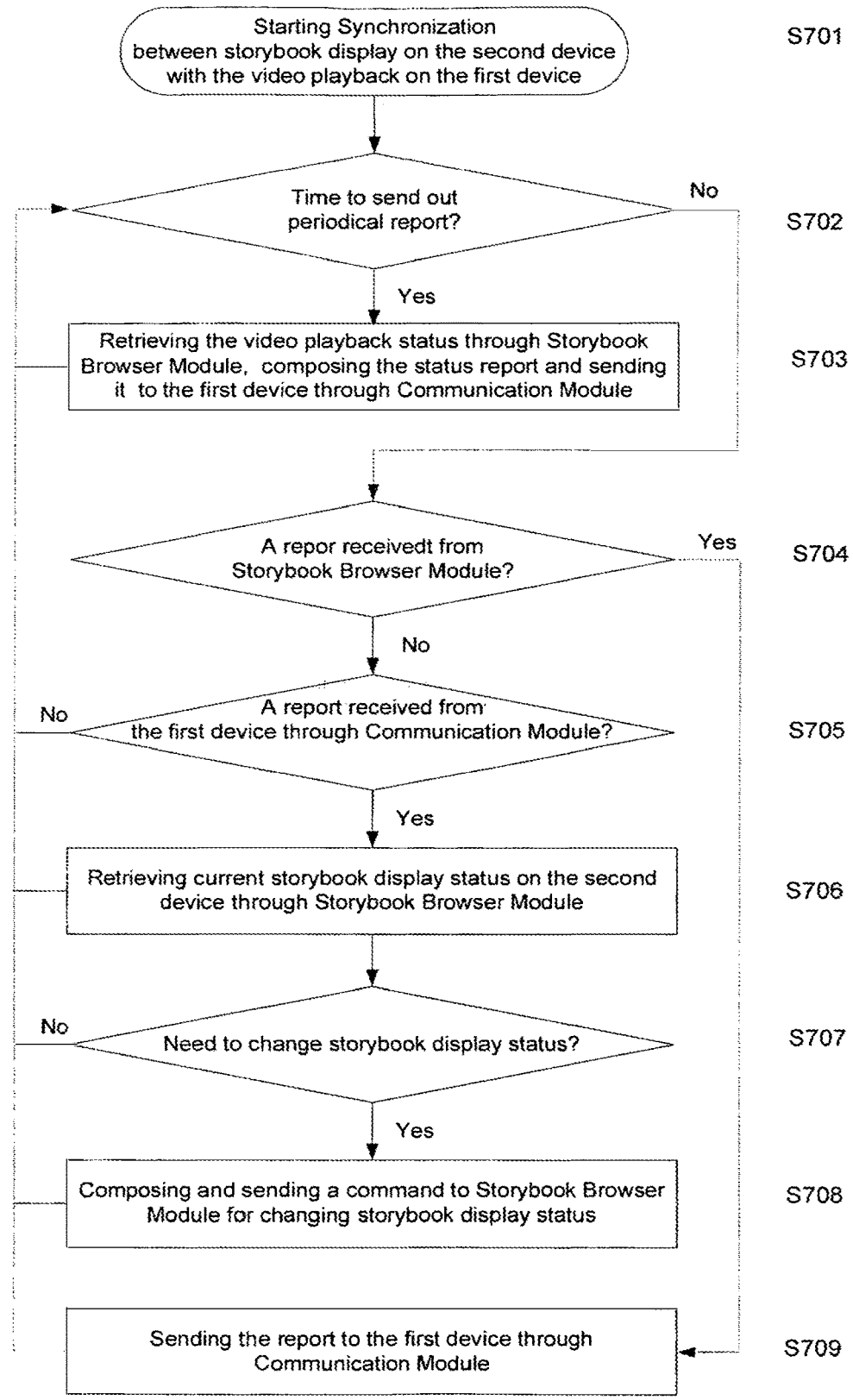
FIG. 7 is a flow chart showing the operation of the synchronization module of the second device.

FIG. 7 is a flow chart showing the operation of the SM132 of the second device 13.

At the step S701, the SM132 starts to synchronize the storybook display on the second device 13 with the video playback on the first device 12.

At the step S702, the SM132 determines whether it is time to send out a periodical report.

If the result of the step S702 is "Yes", at the following step S703, the SM132 will retrieve the video playback status from the SB 131, compose the status report and send the report to the first device 12 through the CM 133.

If the result of the step S702 is "No", the procedure will proceed to the step S704 where the SM132 will determine whether a report is received from the SB 131.

If the result of the step S704 is "Yes", the procedure will proceed to the step S709 where the SM132 will send the report to the first device 12 through the CM 133.

If the result of the step S704 is "No", at the following step S705, the SM132 will determine whether a report is received from the first device 12 through the CM 133.

If the result of the step S705 is "No", the procedure will return to the step S702. If the result of the step S705 is "Yes", at the step S706, the SM 132 will retrieve the current status of storybook playback on the second device 13 from the SB 131.

At the step S707, the SM132 will determine whether it needs to change storybook playback status. If the result of the step S707 is "No", the procedure will return to the step S702. If the result of the step S707 is "Yes", at the step S708, the SM132 will compose and send a command to the SB 131 for changing storybook playback status.

Figure 8:
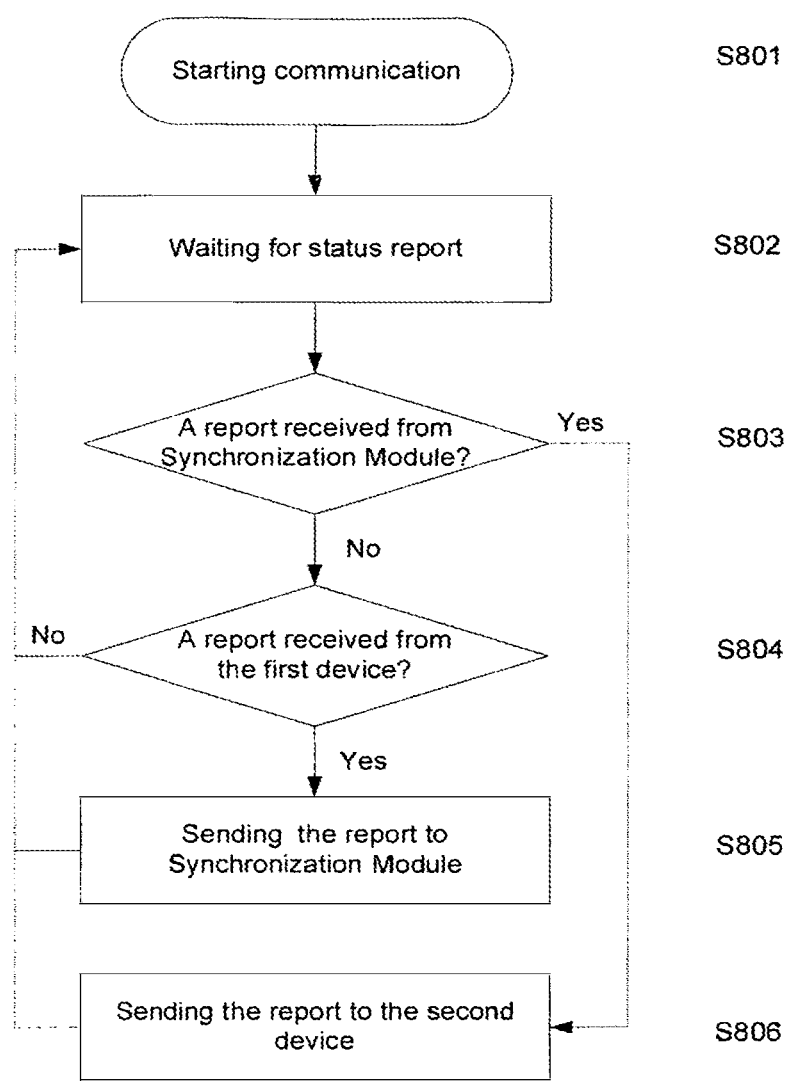
FIG. 8 is a flow chart showing the operation of communication module of the second device.

FIG. 8 is a flow chart showing the operation of CM 133 of the second device 13.

As shown in FIG. 8, at the step S801, the CM 133 starts communication.

At the step S802, the CM 133 will wait for a status report from the SM132 or the first device 12.

At the step S803, the CM 133 will determine whether a report is received from the SM132. If the result of the step S803 is "Yes", the procedure will proceed to the step S806 where the CM 133 will send the report to the first device 12. If the result of the step S803 is "No", the procedure will proceed to the step S804 where the CM 133 will determine whether a report is received from the first device 12.

If the result of the step S804 is "Yes", the procedure will proceed to the step S805 where the CM 133 will send the report to the SM132. If the result of the step S804 is "No", the procedure will return to the step S802.

Figure 9A:
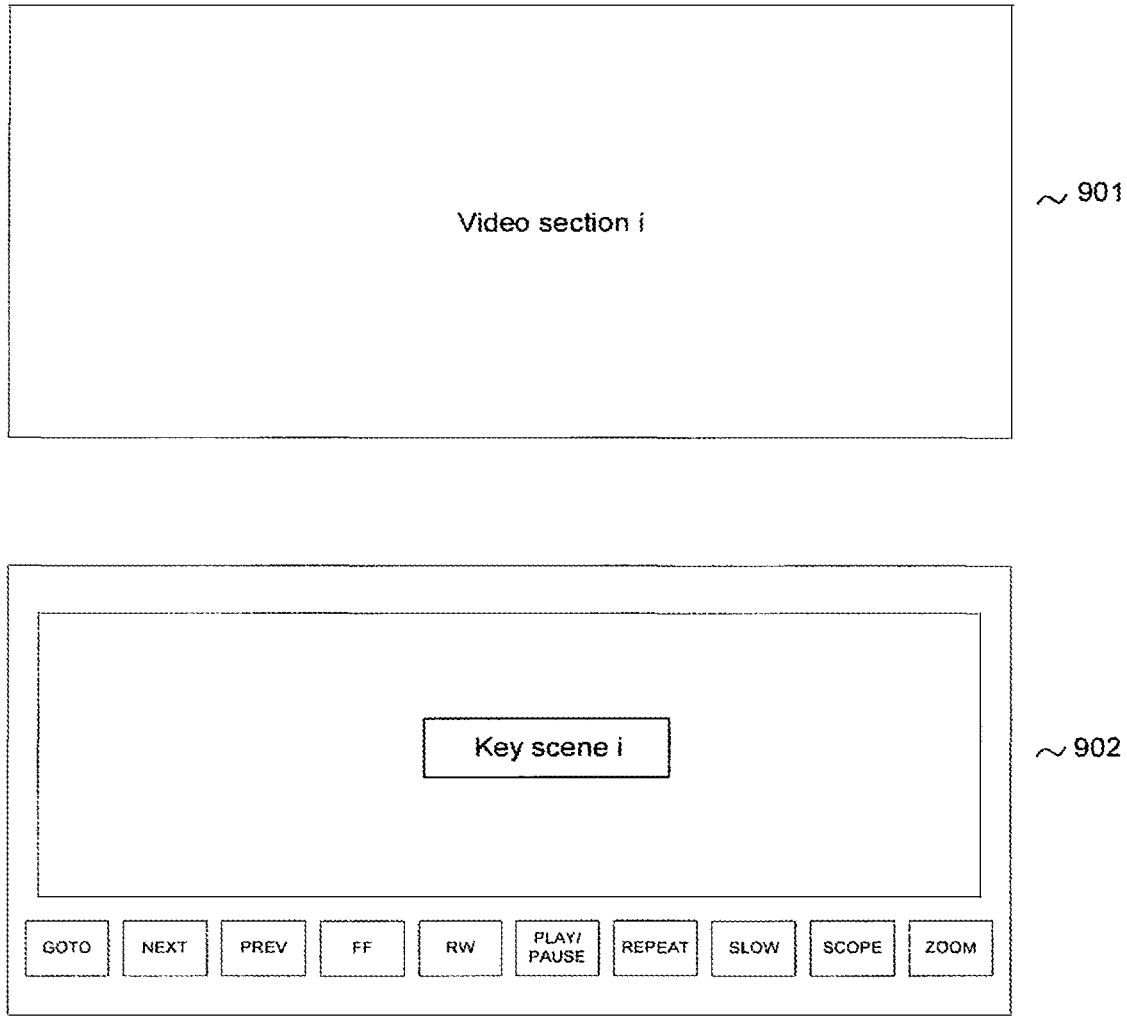
FIGS. 9*a* and 9*b* show examples of exemplified user interface of storybook of a portable device.
Figure 9B:
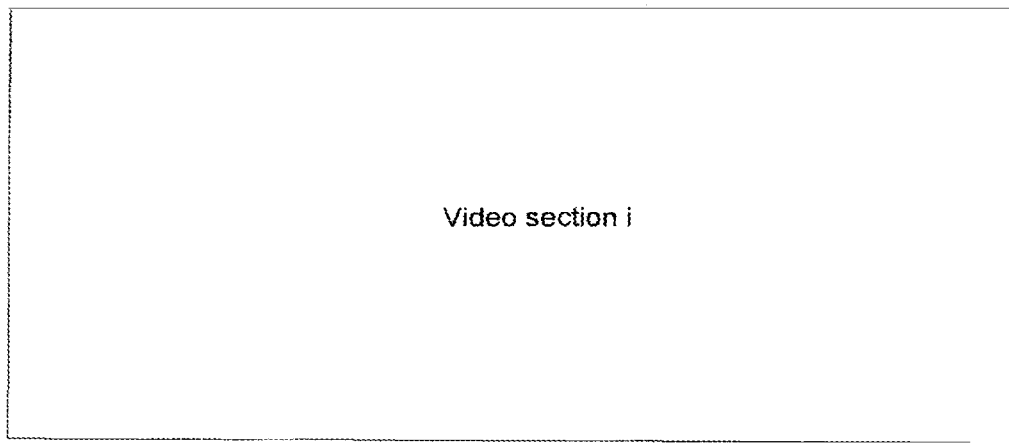
Figure 9B:
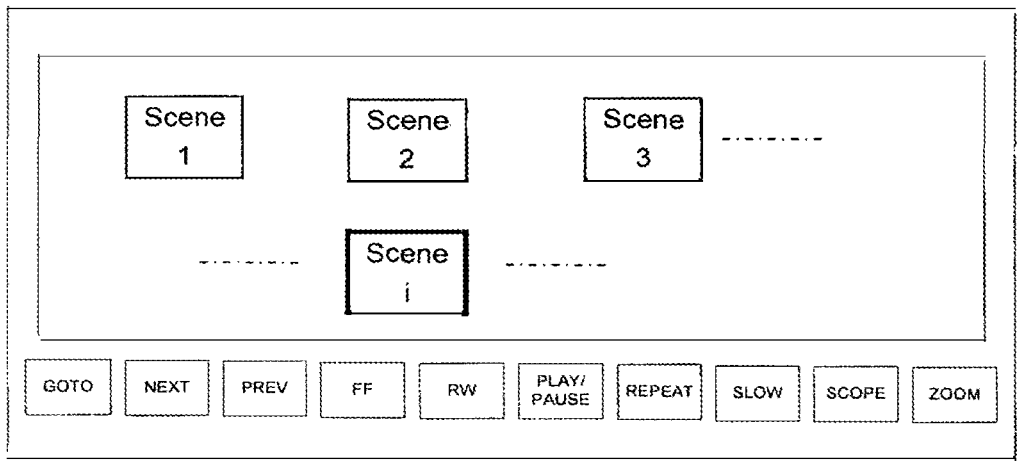

An exemplified user interface of a storybook is shown in FIG. 9. In this example, a trick display of video data on a STB/TV is implemented by the interaction between the TV and a portable device.

As shown in FIG. 9a, the video data, for example a movie, is displayed on the TV screen 901. It can be appreciated that the movie data is composed of a plurality of sections, each of which can be represented by a key scene (which is a fixed image according to the present embodiment, but which may be a video sequence or another representative item). When a video section i (where i may be 0, 1, 2, . . . ) is played back on the TV screen 901, a corresponding key scene i will be displayed on the screen of the portable device 902. In this case, we may call the key scene i the page i since it looks like one page of a storybook which is displayed on the portable device 902 to describe the content played back on the TV screen 901.

As an alternative, a matrix of several key scenes (pages of the storybook) in sequence can be presented on the screen of the portable device 902, as shown in FIG. 9b. In this case, when a video section i is played back on the TV screen 901, the corresponding key scene i will be highlighted dynamically (indicated in FIG. 9b by the block with thick lines).

It can be appreciated by a person skilled in the art that the above two types of user interface can be combined into one implementation. That is, when a video section i is played back on the TV screen 901, a corresponding key scene i will be displayed on the screen of the portable device 902. And at the same time, a list of several key scenes in sequence can also be presented on an appropriate position of the screen of the portable device 902, with the corresponding key scene I highlighted.

An example specifying the content of a storybook is given by the following code.

```
<?xml version="1.0" encoding="UTF-8"?>-<storybook xmlns:xsi="http://www.w3.org/2001/XMLSchema-instance" xsi:noNamespaceSchemaLocation="storybook.xsd">
    <page id="0" timestamp="30.08" image_src="assets/0.png" image_thumbnail_src="assets/0_thumbnail.png"/>
    <page id="1" timestamp="114.032" image_src="assets/1.png" image_thumbnail_src="assets/1_thumbnail.png"/>
    <page id="2" timestamp="299.04" image_src="assets/2.png" image_thumbnail_src="assets/2_thumbnail.png"/>
    <page id="3" timestamp="399.84" image_src="assets/3.png" image_thumbnail_src="assets/3_thumbnail.png"/>
    <page id="4" timestamp="580.16" image_src="assets/4.png" image_thumbnail_src="assets/4_thumbnail.png"/>
    <page id="5" timestamp="725.2" image_src="assets/5.png" image_thumbnail_src="assets/5_thumbnail.png"/>
    <page id="6" timestamp="919.12" image_src="assets/6.png" image_thumbnail_src="assets/6_thumbnail.png"/>
    <page id="7" timestamp="1024.04" image_src="assets/7.png" image_thumbnail_src="assets/7_thumbnail.png"/>
    <page id="8" timestamp="1207.6" image_src="assets/8.png" image_thumbnail_src="assets/8_thumbnail.png"/>
    <page id="9" timestamp="1401.16" image_src="assets/9.png" image_thumbnail_src="assets/9_thumbnail.png"/>
    <page id="10" timestamp="1548.56" image_src="assets/10.png" image_thumbnail_src="assets/10_thumbnail.png"/>
```

```
<page id="11" timestamp="1689.56" image_src="assets/
11.png"      image_thumbnail_src="assets/11_thumbnail.
png"/>
</storybook>
```

In this example, the page id denotes the page index; the timestamp specifies the time relationship between the page and the corresponding video content; the image_src indicates the picture link of the page; and the image_thumbnail indicates the thumbnail picture link of the page.

As shown above, the storybook contains 12 pages with the range from 0 to 11. Page 0 corresponds to the movie section 0 with the timestamp ranging from 0 to 30.08 seconds, page 1 corresponds to the movie section 1 with the timestamp ranging from 30.09 to 114.032 seconds, and so on.

According to the present embodiment, the status of the movie playback on the TV screen is "bi-directionally" synchronized with the display status of the scenes on the screen of a portable device 902.

Specifically, on one hand, when the movie is played back on the TV, a corresponding page (i.e., key scene) on the portable device 902 will be dynamically highlighted during a time interval defined by the timestamp range of a video section to reflect the movie playback progress on the TV. With forward/backward playback of the movie, the highlighted page of the storybook shall be updated as well in order to ensure the above described synchronization. If the user uses a traditional remote controller to fast forward/backward the movie on the TV, the corresponding progress will also be reflected on the portable device 902 with the highlight moving forward/backward page by page.

On the other hand, user interactions to the pages (key scenes) displayed on the screen of the portable device 902 can realize a scene-based trick playback of the movie on the TV. For example, the user can click any of the pages to immediately switch to the corresponding movie section on the TV. In addition, the portable device 902 can also be provided with a menu having several functional buttons to facilitate various trick playback operations.

Figure 10:
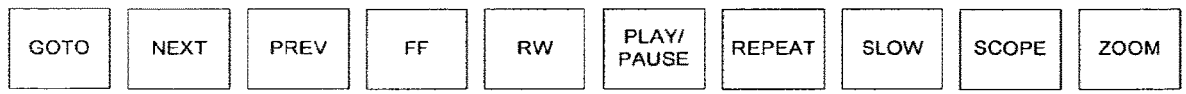
FIG. 10 shows the detailed menu with control buttons of the portable device.

The detailed menu with control buttons of the portable device is shown in FIG. 10. The following are some exemplary trick playback functions provided by the portable device:

GOTO: by tapping/selecting a page in storybook the user can cause video playback to start from the corresponding scene.

NEXT/PREV: by swiping left, respectively right to next respectively previous page in storybook can cause video playback to start from the beginning of the next respectively previous scene.

FF/RW: by swiping repeatedly left respectively right on the storybook, the user can cause video to fast forward/rewind at a speed proportional to the repeating frequency. The speed might be measured in terms of number of scenes per second.

PLAY/PAUSE: by tapping on PLAY, the user can cause video playback to start; maintaining the finger on a page in storybook can cause video playback to pause on a still image of the corresponding scene.

REPEAT: by circling on a page in storybook, the user can cause repeated playback of the corresponding section.

SLOW: by slowly sliding on a page in storybook, the user can cause slow playback of the corresponding section.

SCOPE: by selecting a start page and an end page in a storybook, the user can make video start and stop at the corresponding scenes.

ZOOM: by zooming/focusing on an image page of a storybook, focused zoom is carried out on the video being played back, the center of the zoom can be moved around the display.

Message exchange between the STB/TV and the portable device can be triggered by any one of the following events:

any operation on the STB/TV through the remote controller;

any user interaction performed on the storybook;

a periodical report on the STB/TV video status; and a periodical report on the storybook status of the portable device.

The message exchange between the STB/TV and the portable device is to report local status between devices, and therefore to achieve synchronization as described above. The following message format can be used:

| Availability | Message Payload | Comments |
| --- | --- | --- |
| Required | { | Start of the message payload |
| Required | "Protocol name": "STORYBOOK", | Indicate the protocol name |
| Required | "Version": "1.0", | Indicate the protocol version |
| Required | "Message ID": "1", | Indicate the message identity |
| Required | "Message name": "STATUS REPORT", | Indicate the message name |
| Required | "Device name": "STB/TV", | Indicate the device name, such as STB/TV or Portable device/Storybook. |
| Required | "Device Status": "Active", | Indicate the current device status such as PowerOn, Active and PowerOff |
| Required | "Media status": "Play", | Current media status such as: Goto, FastForward, Rewind, Prev, Next, Play/Pause, Stop, Repeat, Slow, Scope, etc. |
| Optional | "Media type": "Video", | Indicate the current media's type |
| Optional | "Media format": "MPEG4", | Indicate the current media's coding standard |
| Optional | "Media source type": "TV", | The media source type indicates whether or not the media is TV, PVR, or Streaming |
| Optional | "Media url": "22", | Indicate the link information for media flow, which is the channel ID for the TV, directory and file name for the PVR, and url for the streaming media |
| Required | "Current progress": 235690 | The current time stamp for the media: the updated video time stamp if the device name is STB/TV; the time stamp of starting scene corresponding to the current page if the device name is Portable device/Storybook |
| Required | } | End of the message payload |

Note the message body can be extended to include more fields according to the needs of application.

An example of a message exchange between the portable device and the STB/TV when a user presses PREV button on the portable device will be described. In this case, the highlighted page of storybook goes to the previous page.

When the user presses the PREV button, a report is sent from the portable device to the STB/TV with following message body to inform of a change of display status of the storybook on the portable device.

| Availability | Message Payload | Comments |
| --- | --- | --- |
| Required | { | Start of the message payload |
| Required | "STORYBOOK", | Indicate the protocol name |
| Required | "1.0", | Indicate the protocol version |
| Required | "1", | Indicate the message identity |
| Required | "STATUS REPORT", | Indicate the message name |
| Required | "Portable device/Storybook", | Indicate the device name, such as STB/TV or Portable device/Storybook. |
| Required | "Active", | Indicate the current device status such as PowerOn, Active and PowerOff |
| Required | "Prev", | Current media status such as: Goto, FastForward, Rewind, Prev, Next, Play/Pause, Stop, Repeat, Slow, Scope, etc. |
| Optional | "Video", | Indicate the current media's type |
| Optional | "MPEG4", | Indicate the current media's coding standard |
| Optional | "TV", | The media source type indicates whether or not the media is TV, PVR, or Streaming |
| Optional | "Media url": "22", | Indicate the link information for media flow, which is the channel ID for the TV, directory and file name for the PVR, and url for the streaming media |
| Required | "Current progress": 30.09 | The current time stamp for the media: the updated video time stamp if the device name is STB/TV; the time stamp of starting scene corresponding to the current page if the device name is Portable device/Storybook |
| Required | } | End of the message payload |

After receiving the status report from the portable device, the STB/TV will perform the above described synchronization with the information in the message. In addition, the STB/TV can also send a confirmation message back to the portable device with the following message body.

| Availability | Message Payload | Comments |
| --- | --- | --- |
| Required | { | Start of the message payload |
| Required | "STORYBOOK", | Indicate the protocol name |
| Required | "1.0", | Indicate the protocol version |
| Required | "1", | Indicate the message identity |
| Required | "STATUS REPORT CONFIRMATION", | Indicate the message name |
| Required | "STB/TV", | Indicate the device name, such as STB/TV or Portable device/Storybook. |
| Required | "Active", | Indicate the current device status such as PowerOn, Active and PowerOff |
| Required | "Prev", | Current media status such as: Goto, FastForward, Rewind, Prev, Next, Play/Pause, Stop, Repeat, Slow, Scope, etc. |
| Optional | "Video", | Indicate the current media's type |
| Optional | "MPEG4", | Indicate the current media's coding standard |
| Optional | "TV", | The media source type indicates whether or not the media is TV, PVR, or Streaming |
| Optional | "Media url": "22", | Indicate the link information for media flow, which is the channel ID for the TV, directory and file name for the PVR, and url for the streaming media |
| Required | "Current progress": 30.09 | The current time stamp for the media: the updated video time stamp if the device name is STB/TV; the time stamp of starting scene corresponding to the current page if the device name is Portable device/Storybook |
| Required | } | End of the message payload |

It is to be understood that numerous modifications may be made to the illustrative embodiments and that other arrangements may be devised without departing from the spirit and scope of the present invention as defined by the appended claims.

The invention claimed is:

1. A portable device for controlling playback of video data on a first device external to said portable device, comprising:
a browser module operative to display a plurality of images on a display of said portable device, each image corresponding to a section of the video data, and to highlight an image corresponding to the section of the video data currently played back by the first device;
a communication module coupled to the browser module and operative, in response to a selection of an image among the plurality of images by a user, to transmit a first command to the first device to play back the video data corresponding to the image selected by the user; and
wherein the browser module is further operative to adapt highlighting of the plurality of images in response to a second command received from said first device upon a change of the section of video data currently played back on the first device.

2. The portable device of claim 1, wherein the plurality of images differs from the video data.

3. The portable device of claim 1, wherein the plurality of images comprises a summary of a story in the video data.

4. The portable device of claim 1, wherein each section of the video data comprises a scene of the video data.

5. The portable device of claim 1, wherein the communication module being further operative to receive the plurality of images from a second device.

6. The portable device of claim 1, wherein the communication module is further operative to send to a head-end a report on an interaction of the user with the plurality of images, wherein the report includes a click-through rate of video data sections used to compose the plurality of images to provide a summary of the video data sections.

* * * * *